J. L. NEEL.
RECORDING DEVICE.
APPLICATION FILED MAY 14, 1913.
1,100,664.
Patented June 16, 1914.
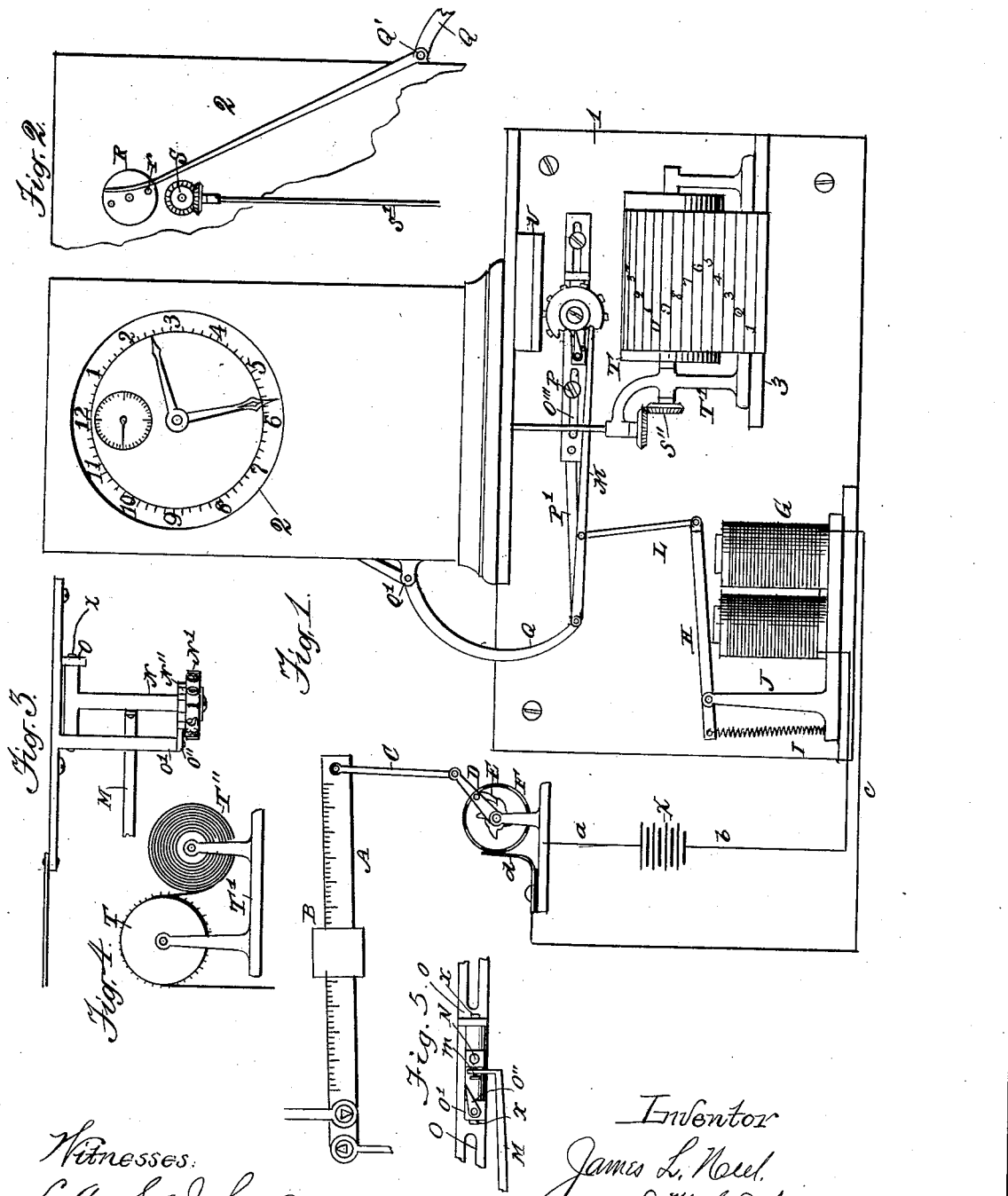
Witnesses.
L. A. St. John.
Edith St. John.
Inventor
James L. Neel.
By J. M. St. John
Atty.

UNITED STATES PATENT OFFICE.

JAMES L. NEEL, OF CEDAR RAPIDS, IOWA, ASSIGNOR OF ONE-HALF TO J. P. WINN, OF CEDAR RAPIDS, IOWA.

RECORDING DEVICE.

1,100,664.　　　Specification of Letters Patent.　　Patented June 16, 1914.

Application filed May 14, 1913. Serial No. 767,621.

*To all whom it may concern:*

Be it known that I, JAMES L. NEEL, a citizen of the United States, residing at Cedar Rapids, in the the county of Linn and State of Iowa, have invented certain new and useful Improvements in Recording Devices, of which the following is a specification.

The object of this invention is to obtain a correct record of the operation of machines in mills or factories, such as will determine in elements of time the output of such machines.

The invention embodies a recording instrument, a clock or like time register, and electrical apparatus, through the concurrent action of which a record is made of the impulses of a machine or machines at a distance.

The nature of the invention is fully disclosed in the description and claims following, reference being had to the accompanying drawings, in which—

Figure 1 is a conventional front elevation of mechanism embodying my invention, Fig. 2 is a fragmentary view of the back side of the clock and a part of the connecting mechanism, Fig. 3 is a plan view of the counter and some of its connected mechanism, and Fig. 4 is an end view of the paper rollers forming a part of the recording apparatus. Fig. 5 is a fragmentary elevation, showing the counter actuating mechanism, with the printing wheel removed.

The device has been more particularly designed with reference to the impulses of a weighing machine in a mill, where the product is bagged, the contents of the bags being correctly weighed. It is desirable for the management in the office in many cases to be apprised of the output of such machines, the continuity of their action and the relative speed of production from hour to hour and from day to day. Such information may be obtained through the action of the device, which forms the subject matter of this invention.

Referring to the drawing, A designates a scale beam provided with its poise or weight B, and this may serve to represent conventionally a weighing machine, though in practice the recording mechanism would preferably be attached to some other part of the machine rather than the scale beam as herein represented. As the device is intended to apply to many different types of machines, however, the construction herein illustrated may serve as typical of the uses to which it may be applied.

As will be seen, to the end of the scale beam is pivoted a link C, and this connects with a lever D, provided with a pawl E, attached to a circuit breaker F. This circuit breaker, through its base, connects by conductors $a$ and $b$ with an electromagnet G, the other leg of the circuit $c$ leading to the brush $d$, making contact with the periphery of the circuit-breaker, which is divided into suitable contact segments separated by insulation as shown. It is evident that when the scale beam is depressed, as happens on the discharge of the load whose weight is indicated by it, the circuit-breaker will be turned through one segment space, closing the circuit of the battery X and energizing the electromagnet. This, of course, depresses the armature H, which is coupled by a link L and a lever M, connected at $m$ with the rocking arm N on the end of which is mounted the printing wheel N'. This lever N, as will be seen by reference to Figs. 3 and 5, is pivoted at $x$ in a sliding bracket O, one arm of which O' extends forward to near the printing wheel, and is provided with a pawl O'' engaging a ratchet N'' attached to the printing wheel. The back plate of this bracket is slotted at O''' so as to slide back and forth a limited distance on supporting screws P, by which it is attached to a suitable support, as for example a back board 1. This back plate is connected, as is also the lever M to a lever Q by a link P'. The lever Q is pivoted at Q', and its upper end extends to a position for engagement with pins or lugs $r$, projecting from a disk R mounted on the arbor of the second hand of a clock 2.

It will thus be seen that a revolution of the second hand will impart two outward impulses to the lever and correspondingly move the back plate and its attachments back and forth. To the rear end of the minute hand arbor is attached a bevel gear S engaging a similar gear on an upright shaft S', and connecting by similar gearing S'' at its lower end with the shaft of the paper drum T, mounted in a suitable frame, T', which for convenience may be set up on a shelf 3, as shown. Adjacent to this drum, is a suitable paper reel T'', carrying a roll of paper which is carried forward by the intermittent revolution of the paper drum, provided with projecting points to engage the paper as shown in Fig. 4. It will be seen that a revolution of the minute hand of the clock will impart a slow forward movement to the paper drum, carrying the papers successively forward. Above the type wheel is mounted an inking pad U, which in practice is preferably provided at one end with ink of a different color from that of the body, so that the record of the zero may be distinctively set out from that of the digits for convenience in counting. This, however, is but a minor detail, and might of course be dispensed with.

It will be seen that as the printing wheel is depressed by the action of the armature H that its ratchet engaging the pawl O" will cause the printing wheel to turn, thus bringing a new type into printing position. On the rise of the printing wheel, the pawl slides idly over the ratchet and then engages another tooth of the ratchet.

From the foregoing, the action of the mechanism will be readily understood. Using the weighing machine as an illustration, the discharge of any load will cause the scale beam to fall, and this in turn closes the electrical circuit, energizing the magnet and drawing down the armature sharply, which has the effect of depressing in the same manner the printing wheel. This has already been inked, and when brought smartly down upon the surface of the paper, running on the paper drum, makes an impression corresponding with the printing figure. As soon as the magnet is deënergized, the armature is drawn up again by the action of a spring I. The clock work in the meantime causes a slow forward movement of the paper wheel. The more rapid movement of the second hand and its engaging mechanism serves to move the type wheel sidewise with respect to the paper and produces the zig zag or staggered printing, as indicated in exaggerated degree in the drawing. The object of this is to prevent the piling up of one figure over another, as would be the case owing to the slow movement of the clock unless the paper roll be made excessively large.

It is evident that the recording mechanism can be located at any convenient place and remote from the actuating machine and the circuit-closer, the current being carried by suitable conductor as indicated. This makes it possible for a person in the office remote from the work room to keep an accurate check upon the operations of a machine in some distant part of the factory.

Having thus described my invention, I claim:

1. Apparatus to record the impulses of a machine embodying an electrical circuit closer and a connection thereof with some reciprocating portion of the machine, a battery, an electromagnet in circuit with said circuit closer, a lever connected with an armature of the electromagnet, a reciprocating printing wheel having a step by step progressive movement, a carrier for said printing wheel connecting by suitable lever with the second hand mechanism of a clock, a clock gearing connected with the minute hand arbor thereof and with a paper drum, said paper drum being set in printing relation with said type wheel, and a suitable inker for the type wheel.

2. In an instrument adapted to record the intermittent impulses of a machine, the combination of a rotating paper drum and recording sheet, a connection for said drum with the minute hand arbor of a clock mechanism, connection with the second hand arbor of the clock adapted to impart a sidewise movement to a printing wheel, and devices for reciprocating and progressively rotating said printing wheel and to cause it to make impressions on said paper, a connection of said printing wheel with the armature of an electromagnet, and mechanism adapted to close said magnet in circuit through the impulses of said machine.

3. In a recording instrument of the class designated, the combination of a paper drum and a connection thereof with clock work adapted to impart to it a regular progressive movement, a reciprocating printing wheel mounted in printing relation thereto, and having a step by step forward rotation, and also adapted for back and forth lateral movement, a connection of said printing mechanism with the second hand mechanism of the clock whereby it is moved sidewise, a ratchet and pawl adapted to impart intermittent rotation to the printing wheel, and mechanism adapted to impart printing movement to said type wheel.

In testimony whereof I affix my signature in presence of two witnesses.

JAMES L. NEEL.

Witnesses:
J. M. St. John,
L. A. St. John.